Dec. 5, 1939.   P. A. SMITH   2,182,364
APPARATUS FOR HEATING TUBULAR MEMBERS
Filed May 10, 1937   2 Sheets-Sheet 1
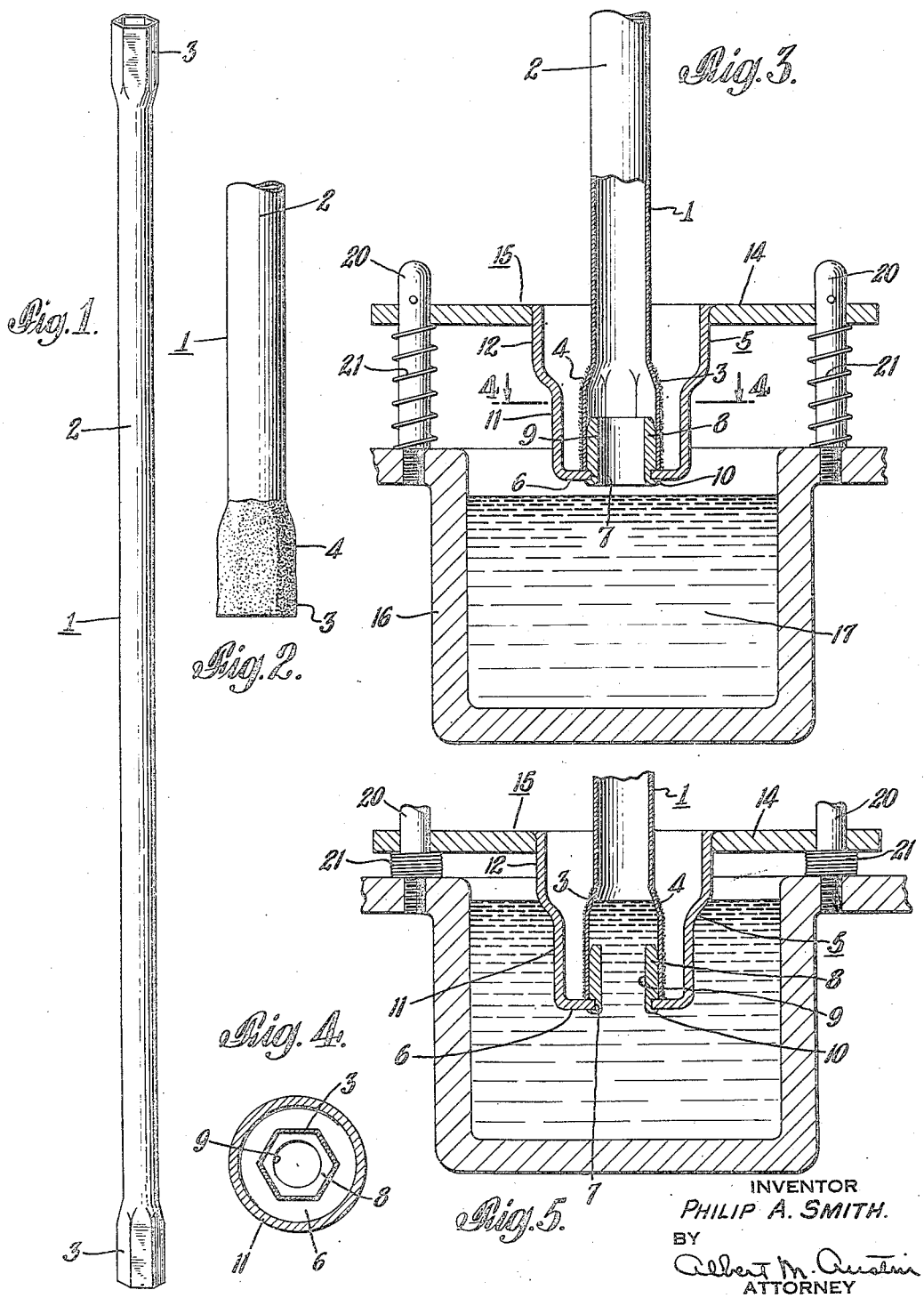
INVENTOR
PHILIP A. SMITH.
BY
Albert M. Austin
ATTORNEY

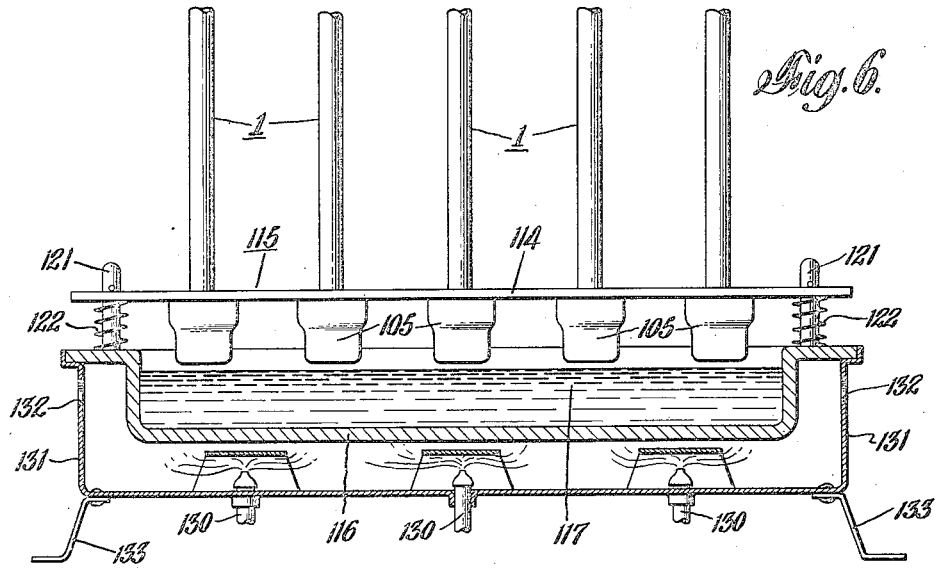
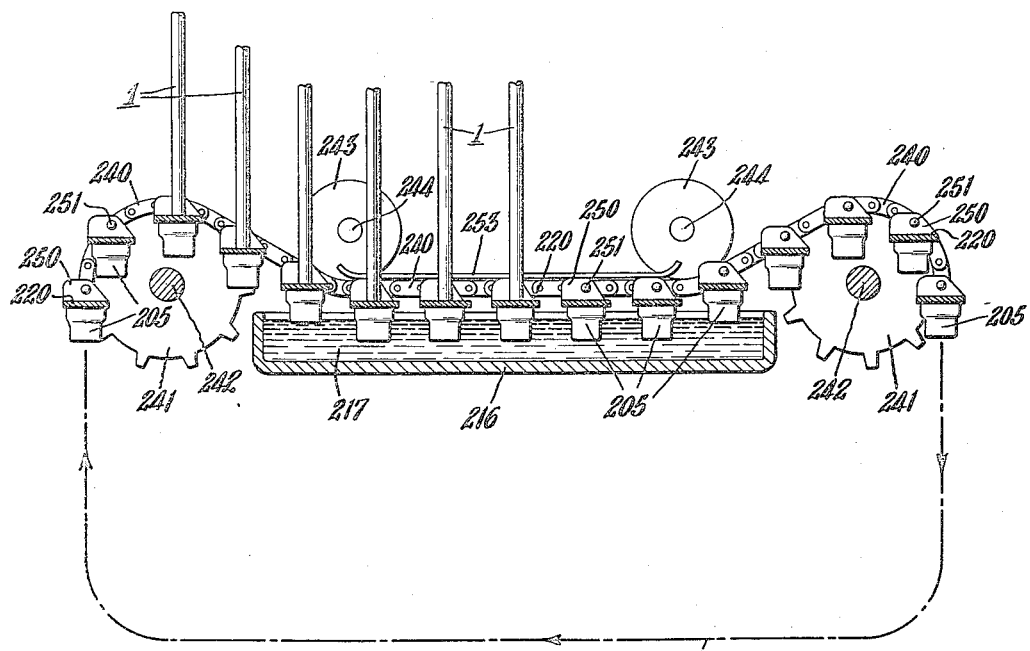
INVENTOR
PHILIP A. SMITH
BY
Albert M. Austin
ATTORNEY

Patented Dec. 5, 1939

2,182,364

UNITED STATES PATENT OFFICE 2,182,364

APPARATUS FOR HEATING TUBULAR MEMBERS

Philip A. Smith, Hamden, Conn., assignor, by mesne assignments, to Western Cartridge Company, a corporation of Delaware Application May 10, 1937, Serial No. 141,649

11 Claims. (Cl. 263—2)

This invention relates to a method and apparatus for heating tubular members and more particularly the heating of a predetermined portion or portions of a tube.

In certain manufacturing processes it is necessary or desirable to apply a relatively high temperature to a portion of a tube or like member in order to produce certain reactions. However, where the member is formed from a material which is annealed or otherwise affected by the temperature required to carry out the reaction, it is often desirable to restrict the heating to a predetermined portion of the member, so that the remaining portion of the member is not heated sufficiently to adversely alter the physical characteristics thereof.

In one embodiment the invention is particularly well adapted for use in the manufacture of heat exchangers, such as radiators, coolers and the like, wherein a plurality of tubes are formed with enlarged ends which are bonded together as by soldering or brazing to retain the tubes in the form of a core. Where the tubes are formed of a metal, as for example, aluminum, which is not easily soldered or brazed, it is desirable to coat the exterior of the tube ends with a readily soldered metal such as copper. In one method of applying the copper coating it is necessary to heat the portion of the tube to be coated to a relatively high temperature, and hence it is desirable to restrict the heating to the portion of the tube to be coated.

According to the present invention, a molten material which does not react with the metal forming the tube is heated to a suitable temperature and is introduced into the interior of the end only of the tube whereby only the end of the tube is heated to the desired temperature. The molten material is restricted and confined so that it is in heat transfer relation with the end of the tube only and is maintained out of contact with the exterior surface of the tube.

The invention also provides a novel apparatus for carrying out the process, which apparatus includes a fixture in the form of a receptacle adapted to receive the end of the tube which is to be heated. The receptacle has an opening therein for admitting molten material, and a stud or like member is associated with the opening for positioning the tube in registry therewith. A bath of molten material is provided and the material is introduced into the interior of the tube through the opening in the fixture, as for example, by dipping the fixture in the bath. The walls of the receptacle and the stud restrict the molten material so that it is confined to a predetermined portion of the interior of the tube and is maintained out of contact with the exterior surface. Suitable means are provided whereby the fixture may be mounted in association with the bath and may be guided for predetermined, limited insertion in the bath. The invention also contemplates the provision of a fixture for simultaneous heating of a plurality of tubes and it also provides apparatus for automatically carrying a plurality of fixtures through the bath.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a perspective view of one form of tube used in forming a heat exchanger;

Fig. 2 is an enlarged elevational view showing one end of the tube of Fig. 1 with the coating material or paint applied thereto;

Fig. 3 is a somewhat diagrammatic vertical sectional view through one form of apparatus suitable for carrying out the invention;

Fig. 4 is a transverse cross-sectional view taken along line 4—4 of Fig. 3.

Fig. 5 is a view similar to Fig. 3, but showing the fixture in depressed position with a portion of the fixture inserted in the bath and the molten material in the end of the tube;

Fig. 6 is a somewhat diagrammatic vertical sectional view through another form of apparatus suitable for carrying out the invention and showing a plurality of fixtures for heating a plurality of tubes simultaneously; and Fig. 7 is a somewhat diagrammatic elevational view showing another form of apparatus wherein a series of fixtures can be carried successively through the bath.

In the following description and in the claims, various details will be identified by specific names for convenience, but they are intended to be as generic in their application as the art will permit. Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

The invention is applicable to the heating of various types of members for carrying out various operations thereon but, for the purposes of illustration, the invention is described in connection with its application to the heating of aluminum radiator core tubes to deposit a metal coating thereon.

Referring now particularly to Fig. 1, there is shown a tube 1 of aluminum formed in a suitable manner and having a cylindrical body 2 and enlarged ends 3 of hexagonal shape. The ends 3 are of sufficient diameter so that when the tube 1 is assembled with a number of similar tubes to form a core (not shown), the body portions 2 of the tubes are suitably spaced from each other.

Referring now particularly to Figs. 3, 4 and 5, there is shown one form of apparatus suitable for carrying out the process in accordance with the invention and illustrating a novel form of apparatus constructed in accordance with the invention.

The apparatus comprises a fixture 15 which has a portion formed as a cup-like receptacle 5 of good heat conducting material, such as metal, which receptacle is adapted to receive and surround one end of the tube. The bottom wall 6 of the receptacle 5 is provided with an opening 7 with which the interior of the tube 1 is adapted to register. A hollow stud 8, having a passage 9 surrounds the opening 7 and extends upwardly from the bottom of the receptacle. The stud 8 is formed of a metal which does not oxidize at the temperature of the reaction and may be either integral with the receptacle or formed separately and secured to the receptacle as by a riveted head 10, as shown in Fig. 3.

The stud 8 is shaped to correspond to the end 3 of the tube and to receive the end 3 snugly thereover whereby to maintain the interior of the tube in registry with the opening 7. Since the stud is non-oxidizing, its surface remains smooth and uniform in size through a long period of use and thus no difficulty is encountered in inserting the tube thereon. The stud also assists in confining the molten heating material to the interior of the tube as will hereinafter be pointed out. The stud 8 may be of sufficient height to serve as means for supporting the tube 1 in the receptacle 5 and may extend to the top of the tube end 3. If desired, however, the stud 8 may extend upwardly only a sufficient height to position the tube in the receptacle.

The side wall 11 of the receptacle may have any desired shape, but preferably it is generally circular, hexagonal or the like so that it is spaced substantially equally from all portions of the tube end 3, thus providing uniform heating of the tube end. The upper portion of the wall 12 may be enlarged to permit ready insertion of the tube 1 in the receptacle and to facilitate removal of the waste products of the reaction.

The receptacle 5 may be secured to or formed integral with a suitable support 14 by which the receptacle can be conveniently manipulated. The molten heating material may be introduced into the interior of the tube in a suitable manner. One method which has been found suitable consists in immersing the lower portion of the receptacle in a bath of molten material whereby the material flows into the receptacle through the passage 9 and into the interior of the tube end 3. The bath includes a tank 16 having therein a quantity of molten material (designated by the reference character 17), having a suitable melting point and chemically inert to the material of the tube. One such material which has been found particularly suitable is lead, inasmuch as it is molten below the temperature required for carrying out the reaction, does not react with the aluminum, and does not adhere to the tube or the fixture when they are removed from the bath.

The receptacle 5 may be inserted in the bath in any suitable manner, as for instance, manually or by suitable apparatus. By way of example, the support 14 is shown as slidable on a plurality of posts 20 adjacent the tank 16. Means for supporting the receptacle 5 out of contact with the bath may be provided such, for example, as springs 21 which can be compressed to permit the fixture to be lowered to insert the receptacle into the bath. The downward movement of the fixture preferably is limited, as by the springs 21, whereby the fixture is halted in such a position that the lead rises only a predetermined distance into the end of the tube, thereby permitting close regulation of the heating of the tube.

A suitable decomposable compound of the metal to be deposited on the ends of the tube is suspended in a liquid or plastic vehicle to form a liquid or pasty "paint" which is applied to the ends 2 of the tube to form a layer or film thereon, as indicated by the reference character 4 in Fig. 2.

One example of a material which is particularly suitable for forming an adherent metallic coating which provides a suitable means for soldering tubes together, is copper. A decomposable salt of copper, such as cuprous chloride is pulverized and mixed with a suitable vehicle, as for example, gasoline or kerosene, to form a thin paste-like or semi-liquid "paint". The paint is applied to the ends 3 of the tube as by painting the material thereon or by dipping the tube in the paint. The paint should be sufficiently thin so that it can be readily spread and will provide a relatively thin layer or film on the tube but sufficiently thick to adhere to the tube.

The tube 1 is inserted over the stud 8 and forced downwardly into abutment with the floor of the receptacle 5, the stud 8 being of such size and shape as to provide a comparatively snug fit for the tube. The fixture 15 is then depressed to insert the lower end of the receptacle 5 into the bath, as illustrated in Fig. 5, whereby the molten lead is forced upwardly through the passage 9 in the stud and into the interior of the tube end 3.

The molten lead is maintained at a temperature of about 900° F. but may vary between 850° F. and 1000° F., depending upon the time required and the mass involved. The tube is subjected to this temperature for a sufficient time to completely decompose the cuprous chloride. For example, to produce the proper reaction on a tube of .006″ wall thickness for a distance of ½″ with a lead bath temperature of 950° F., the time required will be about two minutes. The heat causes the cuprous chloride to decompose and leave the copper deposited on the outer end 3 in the form of a closely adherent thin coating of metallic copper. The gaseous products of the reaction pass off and are expelled through the open upper end of the receptacle.

When no further gas can be observed passing out of the receptacle, the reaction is complete and the fixture 15 is elevated out of contact with the bath. The lead which is inside the tube and stud does not adhere thereto but runs out when the fixture is removed from the bath.

The tube 1 is removed from the fixture and the end 3 is quenched in cold water to facilitate the removal of the crust which is formed over the copper during the reaction. After quenching, the tube end 3 is cleaned as by means of water, lava soap and a brush to remove foreign matter and to expose the coating of metallic copper.

The other end 3 of the tube is subjected to a similar series of operations to deposit thereon a thin copper coating and the tube is then ready to be soldered or brazed to similarly coated tubes.

It will be noted that the side wall portions 11 and 12 of the receptacle 5 are spaced from the tube thereby providing a substantial space around the tube. This prevents the dried coating from being rubbed off when the tube is inserted in the fixture and also permits the gaseous product of the heating to pass off readily. The wider spacing of the upper end of the receptacle from the tube prevents the portion of the tube above the end from being overheated.

It will be noted that the body 2 of the tube is fully exposed to the air and is maintained out of contact with the molten lead. If desired, the body 2 may be cooled in a suitable manner as by passing a current of air past the body thereby carrying away any heat which has been conducted from the heated end 3 to the body 2. Inasmuch as the tube has a relatively high ratio of area to mass, any heat which is conducted to the body from the end will be rapidly dissipated. Thus the body will not attain a temperature sufficient to cause annealing and other undesirable changes in the physical characteristics of the metal.

Various modifications may be made in the fixture to adapt it for use with various types of tubes and for cooperation with associated apparatus for manipulating the fixture.

Referring now to Fig. 6, there is shown somewhat diagrammatically apparatus wherein a plurality of fixtures are carried by a single support, whereby all of the fixtures can be inserted in the bath simultaneously.

The apparatus includes a plurality of receptacles 105, each of which may be formed in a manner similar to the receptacle 5, shown in Fig. 3. The receptacles 105 are all carried by a single support 114 to form a unitary fixture 115 for handling a plurality of tubes simultaneously.

A bath is constituted by an elongated tank 116 adapted to accommodate all of the receptacles 105 and containing a quantity 117 of molten lead or other suitable liquid heating medium. The bath may be heated in any suitable manner and, for the purposes of illustration, there has been shown a plurality of heating jets 130 associated with a shield 131 having outlets 132 and supported on a standard 133. Preferably, the source of heat is suitably distributed, as for example, by providing a suitable number of spaced jets 130 so that all portions of the bath are maintained at a substantially uniform, predetermined temperature.

The fixture 115 may be manipulated manually to immerse the receptacles 105 in the bath or may be guided as by a pair of posts 121 having springs 122 associated therewith in a manner generally similar to that shown in Fig. 3.

The operation of this form of apparatus is generally similar to that above described, except that a plurality of tubes are inserted in the fixture 115 and are heated simultaneously.

The present invention may be conveniently carried out by semi-automatic or automatic apparatus thus eliminating hand operations either partially or entirely. For example, a plurality of receptacles may be carried on a conveyor mechanism adapted to immerse the receptacles in the bath either successively or in groups, as a continuous operation.

Referring now to Fig. 7, there is shown somewhat diagrammatically, apparatus including a bath constituted by an elongated tank 216 containing a quantity of molten lead 217 or other liquid heating medium. The bath is heated in any suitable manner to produce a uniform predetermined temperature of the heating medium.

A plurality of receptacles 205 are provided, each of which may be formed generally similar to the receptacle 5 above described. The receptacles 205 are mounted on an endless chain 240 adapted to carry the receptacles successively into the bath. The chain may be trained over a plurality of drive sprockets 241 mounted on shafts 242 and driven by a suitable source of power (not shown). Idler wheels 243 are mounted on shafts 244 adjacent the tank 216 for depressing the chain whereby the receptacles 205 are carried into the bath.

The receptacles 205 may be mounted on the chain in any suitable manner. For example, one or more receptacles 205 are carried by a transverse support 220 having upstanding flanges 250 connected to the chain 240 as by a link pin 251. The flanges 250 may serve as means for maintaining the receptacles 205 positively in upright position while passing through the bath, a guide bar 253 being provided for engagement with the upper edges of the flanges 250.

The tubes 1 are coated with the coating material or paint as above described and are inserted, either manually or by suitable automatic mechanism (not shown), into the respective receptacles 205 prior to the entrance of the receptacles into the bath. The sprockets 241 are driven to advance the chain and the latter carries the receptacles 205 successively into the bath wherein the receptacles and the tubes therein are heated to a desired temperature. The bath is of sufficient length whereby the tubes are heated for a sufficient time to complete the desired reaction. The chain may be advanced either continuously or intermittently to advance the tubes. After each receptacle passes out of the bath, the tube may be removed in a suitable manner.

The present invention provides a method for heating the ends only of the tubes whereby the bodies of the tubes are not heated sufficiently to adversely affect the physical characteristics thereof. The use of a molten heating medium facilitates the obtaining and maintaining of a uniform, predetermined and readily controlled temperature suitable for carrying out the reaction.

The apparatus provides a convenient agency for carrying out the process and permits the process to be carried out either entirely by hand, semi-automatically or entirely automatically. The fixture provides a simple and effective mechanism for introducing the heating material into a limited portion of the tube and for preventing contact between the heating material and the surface to be coated or the coating material.

While certain novel features of the invention have been disclosed and are pointed out in the annexed claims, it will be understood that various omissions, substitutions and changes may be made by those skilled in the art without departing from the spirit of the invention.

What is claimed is:

1. Apparatus for heating the end of a metal tube, which apparatus comprises a bath of molten material and a fixture comprising a wall adapted to surround the end of said tube and having a passage therethrough communicating with the interior only of said tube, means mounting said fixture for insertion into said bath, and means for limiting the movement of said fixture into said bath whereby said molten material is introduced into a limited portion of the interior only of said tube.

2. Apparatus for applying heat to the end of a metal tube, which apparatus comprises a bath of molten material, a support for the tube comprising a receptacle having an opening therethrough, and means for positioning the tube in said receptacle with the interior of said tube in communication with said opening, and means mounting said receptacle for at least partial immersion in said bath whereby to introduce said molten material into the interior of said tube.

3. Apparatus for heating the end of a metal tube, which apparatus comprises a bath of molten material, and a fixture comprising a wall adapted to surround the end of said tube and having a passage therethrough communicating with the interior only of said tube, whereby when said fixture is inserted a predetermined distance into said bath said molten material enters the interior only of said tube.

4. Apparatus for heating metal tubes comprising a bath of molten material, a receptacle for insertion in said bath, an opening into said receptacle, and a stud associated with said receptacle for positioning a tube in registry with said opening, said stud being formed of a material which is non-oxidizing at the temperature of said molten material.

5. A fixture for use in heating metal tubes, which fixture comprises a cupped receptacle having an opening through the wall thereof, and means associated with said opening for supporting a tube with the interior thereof in registry with said opening.

6. A fixture for use in heating metal tubes, which comprises a cupped receptacle having an opening through the wall thereof, and means surrounding said opening for positioning a tube in said receptacle with the interior of said tube in registry with said opening.

7. A fixture for heating the end of a metal tube comprising a receptacle, an opening through the bottom of said receptacle, means for positioning a tube in said receptacle with the interior of the tube in communication with said opening and with the ends of the tube spaced from the wall of said receptacle, and a second opening permitting said tube to extend out of said receptacle.

8. A fixture for use in heating the end of a tube comprising a receptacle, a stud upstanding in said receptacle from a wall thereof and shaped to snugly receive the end of a tube thereover, and a passage through said receptacle and stud providing means for introducing a liquid into the interior only of a tube on said stud.

9. A fixture for use in heating metal tubes, said fixture comprising a receptacle formed from heat-conducting material and having a generally tubular portion, a passage extending into said receptacle, and means for positioning a tube in communication with said passage and substantially concentric with the walls of said tubular portion, whereby heat applied to the exterior of said tubular portion is transmitted substantially uniformly to said tube.

10. Apparatus for heating the ends of a plurality of tubes simultaneously, said apparatus comprising in combination a bath of liquid heating material and a fixture for introducing said tubes into said heating material, said fixture comprising a frame and a plurality of receptacles carried on said frame, adapted to receive the ends of a tube to be heated, each receptacle having an opening therein, and means for positioning a tube in registry with said opening.

11. Apparatus for heating the ends of tubes, said apparatus comprising a bath of liquid heating material, an endless conveyor element, a plurality of fixtures carried on said conveyor element, each of said fixtures including a receptacle adapted to receive the end of a tube, a passage leading into said receptacle, and means for registering the interior of a tube with said passage, means for driving said conveyor element to advance said fixtures, and means for guiding said fixtures through said bath whereby said heating material is introduced through said passage and into the interior of said tubes.

PHILIP A. SMITH.